United States Patent [19]
Nagao et al.

[11] 4,389,665
[45] Jun. 21, 1983

[54] COLOR DEMODULATION DEVICE FOR USE IN COLOR TELEVISION RECEIVERS

[75] Inventors: Nobuya Nagao; Teturou Sakai, both of Fukaya, Japan

[73] Assignee: Tokyo Shibaura Denki Kabushiki Kaisha, Japan

[21] Appl. No.: 304,591

[22] Filed: Sep. 22, 1981

[30] Foreign Application Priority Data

Sep. 30, 1980 [JP] Japan ................. 55-135198

[51] Int. Cl.$^3$ ............................................. H04N 9/50
[52] U.S. Cl. ...................................... 358/23; 358/31; 358/37
[58] Field of Search ................ 358/23, 24, 25, 31, 358/36, 37, 904; 329/50

[56] References Cited

U.S. PATENT DOCUMENTS 3,405,230 10/1968 Parker .
3,405,231 10/1968 Hilbert et al. .
4,074,321 2/1978 Miller .
4,307,414 12/1981 Lee .
4,313,131 1/1982 Lee .

Primary Examiner—Robert L. Richardson
Attorney, Agent, or Firm—Finnegan, Henderson, Farabow, Garrett & Dunner

[57] ABSTRACT

A composite video signal is separated into luminance signal component and carrier chrominance signal component by means of a signal separation circuit using a comb filter. The carrier chrominance signal component is multiplexed in frequency-interleaved relation with the luminance signal component, and formed by quadrature modulation of a color subcarrier with a wideband I signal and a narrowband Q signal. A line correlation detector for detecting the correlation between video signals on adjacent horizontal scanning lines is connected with both outputs of the signal separation circuit. The detector detects the absence of line correlation when color subcarrier frequency appears simultaneously at both outputs of the signal separation circuit. The I signal is demodulated in wideband when the line correlation exists and in narrowband when no line correlation exists.

6 Claims, 7 Drawing Figures

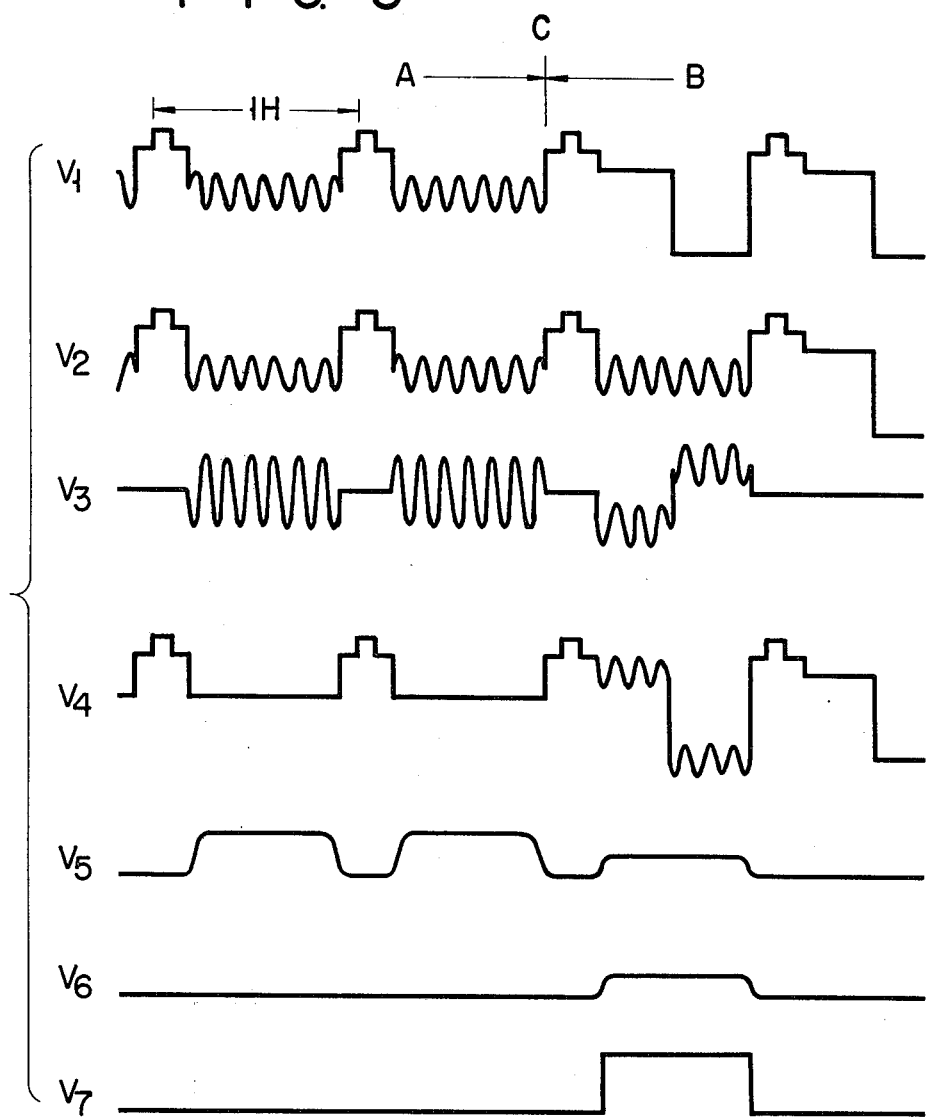

COLOR DEMODULATION DEVICE FOR USE IN COLOR TELEVISION RECEIVERS

BACKGROUND OF THE INVENTION

This invention relates to a color demodulation device for use in color television receivers.

In the NTSC system, as is well known, a carrier chrominance signal is multiplexed in frequency-interleaved relation with a luminance signal of 0 to 4.2 MHz. The carrier chrominance signal is produced by quadrature modulation of a color subcarrier with an I signal for orange and cyan having a frequency band of 0 to 1.5 MHz and a Q signal for green and magenta having a frequency band of 0 to 0.5 MHz. The Q signal is transmitted with double sidebands, while the I signal is transmitted with a lower sideband and a vestigial sideband. In the carrier chrominance signal, therefore, Q signal component has a transmission bandwidth of 3.1 MHz to 4.1 MHz, while I signal component has a transmission bandwidth of 2.1 MHz to 4.1 MHz. As stated above, the I signal has more bandwith than the Q signal. The purpose of more bandwith of I signal is to allow more color detail at the receiver for orange and cyan.

In order to eliminate cross-color disturbance, there is provided a signal separation circuit using a comb filter which effectively separates the carrier chrominance and luminance signals. The use of such signal separation circuit allows wideband demodulation of the I signal.

The aforesaid signal separation circuit is composed of a delay circuit (recently made of a charge coupled device or bucket bridge device having a wide passband characteristic) for delaying a composite video signal by one horizontal scanning period (1 H period), an adder circuit connected to receive the input and output signals of the delay circuit for extracting luminance signal component, and a subtracter circuit connected to receive the input and output signals of the delay circuit for extracting carrier chrominance signal component.

Such signal separating function is based on the fact that the luminance signal component and the carrier chrominance signal component are in frequency-interleaved relation, and hence luminance signals on adjacent horizontal lines are in phase, and carrier chrominance signals on the adjacent lines are 180° out of phase. The signal separation is perfectly achieved when a line correlation exists between video signals on two adjacent lines. In the absence of the line correlation, however, the signal separation is imperfect, so that the carrier chrominance signal component appears in the output signal of adder circuit, while luminance signal component appears in the output signal of subtracter circuit. A reproduced picture will suffer dot disturbance due to the carrier chrominance signal component appearing in the output signal of adder circuit, whereas the cross-color disturbance will be caused by the luminance signal component appearing in the output signal of subtracter circuit. Thus, in the absence of the line correlation, the wideband demodulation of I signal for the reproduction of high-quality color picture will increase the cross-color disturbance.

SUMMARY OF THE INVENTION

An object of this invention is to provide a color demodulation device which is constructed to perform wideband demodulation (0 to 1.5 MHz) of color signal in the presence of line correlation and to perform narrowband demodulation (0 to 0.5 MHz) of the color signal in the absence of line correlation to reduce the cross-color disturbance.

A color demodulation device according to this invention is provided with a signal separation circuit which uses a comb filter for separating a composite video signal into luminance signal and carrier chrominance signal components. In the NTSC system, the carrier chrominance signal component is multiplexed in frequency-interleaved relation with the luminance signal component. The carrier chrominance signal component is formed by quadrature modulation (suppressed-carrier AM) of color subcarrier (3.57 MHz) with an I signal (0 to 1.5 MHz) and a Q signal (0 to 0.5 MHz). In the carrier chrominance signal, I signal component has a transmission bandwith larger than Q signal component.

A line correlation detector circuit for detecting the correlation between video signals on adjacent horizontal lines is connected with first and second outputs of the signal separation circuit from which the carrier chrominance signal component and luminance signal component are extracted respectively. The line correlation detector circuit detects the absence of the line correlation in response to color subcarrier frequency component which appears simultaneously at the first and second outputs of the signal separation circuit.

In this invention, narrowband demodulation of the I signal is performed in the absence of the line correlation between video signals on adjacent horizontal scanning lines, while wideband demodulation of the I signal is performed when the line correlation exists. Specifically, the I signal recovered from the carrier chrominance signal component by an I signal demodulator (synchronous domulator), as well as a demodulated Q signal, is applied to a matrix circuit in wideband (0 to 1.5 MHz) when the line correlation exists, and in narrowband (0 to 0.5 MHz) when no line correlation exists. Alternatively, the carrier chrominance signal component is applied to the I signal demodulator in wideband (2.1 MHz to 4.1 MHz) when the line correlation exists, and in narrowband (3.1 MHz to 4.1 MHz) in the absence of the line correlation.

BRIEF DESCRIPTION OF THE DRAWINGS

FIG. 3 exaggeratively shows signal waveforms obtained at various portions of FIG. 1, for explanation of the operation of the line correlation detector of FIG. 1;

DETAILED DESCRIPTION OF THE PREFERRED EMBODIMENTS

Figure 1:
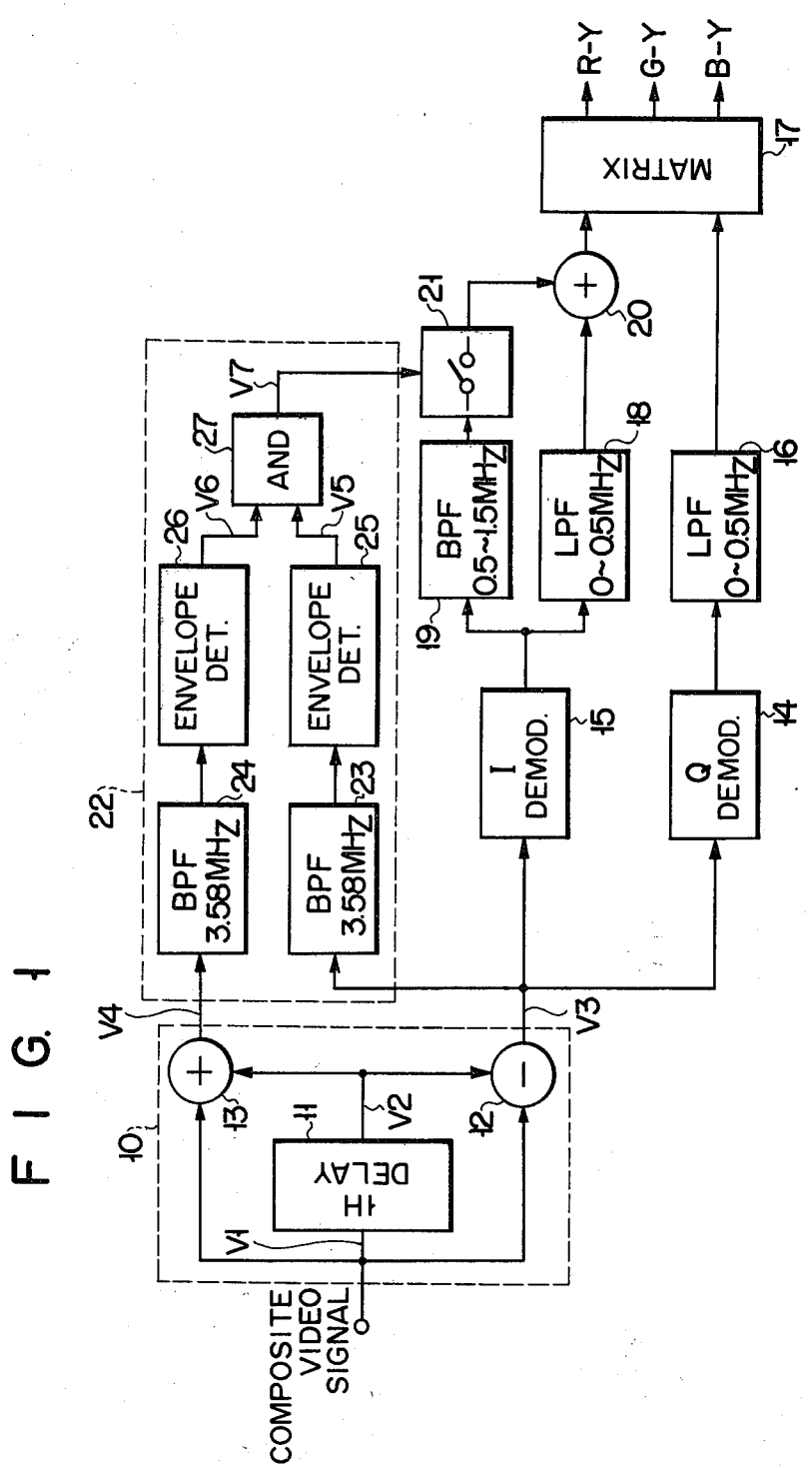
FIG. 1 is a block diagram of a color demodulation device according to an embodiment of this invention.

Referring now to FIG. 1, there is shown in block form a color demodulation device using a comb filter according to this invention. A composite video signal from a video detector stage (not shown) is applied to a 1-H delay line 11 for a time delay of one horizontal scanning period. The input and output signals of delay line 11 are both applied to a subtracter circuit 12 and an adder circuit 13, so that carrier chrominance signal and luminance signal are extracted from subtracter circuit 12 and adder circuit 13, respectively, as mentioned before. The 1-H delay line 11, subtracter circuit 12, and adder circuit 13 constitute a signal separation circuit 10 using comb filter. More specifically, 1-H delay line 11 and subtracter circuit 12 form a comb filter for chrominance signal separation, while delay line 11 and adder circuit 13 form a comb filter for luminance signal separation.

The output signal of subtracter circuit 12 is applied to a Q signal demodulator 14 and an I signal demodulator 15, where I and Q signals are demodulated separately. The Q signal is applied to a matrix circuit 17 through a lowpass filter 16 having a passband of 0 to 0.5 MHz. The I signal is supplied to a lowpass filter 18 having a passband of 0 to 0.5 MHz and a bandpass filter 19 having a passband of 0.5 MHz to 1.5 MHz. The output signal of lowpass filter 18 is applied to matrix circuit 17 through an adder circuit 20. The output signal of bandpass filter 19 is applied to adder circuit 20 through switch circuit 21 which is controlled by a line correlation detector 22 as mentioned later. The matrix circuit 17 matrixes the I and Q signals to produce color difference signals R-Y, G-Y and B-Y which are applied to a color cathode-ray tube.

When no line correlation is detected, the switch circuit 21 is turned OFF by line correlation detector 22 to cause a narrowband I signal from lowpass filter 18 to be applied to matrix circuit 17. Thus, the narrowband demodulation of I signal is performed. When the line correlation is detected by line correlation detector 22, on the other hand, switch circuit 21 is turned ON. As a result, the output signals of lowpass filter 18 and bandpass filter 19 are added together by adder circuit 20 and then applied to matrix circuit 17. Thus, the wideband demodulation of I signal is performed.

The line correlation detector 22 includes bandpass filters or resonant circuits 23 and 24 connected respectively with subtracter 12 and adder 13 for passing color subcarrier frequency component of 3.58 MHz only, envelope detectors 25 and 26 connected respectively with bandpass filters 23 and 24, and an AND circuit 27 which turns ON or OFF switch circuit 21 in response to the outputs of envelope detectors 25 and 26.

Figure 2:
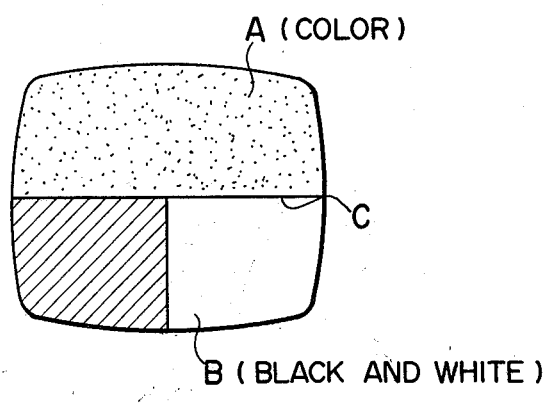
FIG. 2 is a diagram for illustrating a line correlation.

Referring now to FIGS. 2 and 3, there will be described the operation of the color demodulation device of FIG. 1.

Suppose that a picture as shown in FIG. 2 is transmitted in which the upper and lower halves A and B are in color and black and white, respectively. In this picture, line correlation is lost at the boundary C.

FIG. 3 exaggeratively shows waveforms of signals v1 to v7 at various portions of FIG. 1 with respect to the horizontal lines in the vicinity of the boundary C. As shown in FIG. 3, the input signal v1 of delay line 11 contains carrier chrominance signal and luminance signal on lines before the boundary C, and only luminance signal on lines after the boundary C. The output signal v3 of subtracter circuit 12 which receives the input signal v1 and output signal v2 of delay line 11, as shown in FIG. 3, contains only the carrier chrominance signal on the lines before the boundary C, both luminance and chrominance signal components on the line next to the boundary C, and no chrominance signal on the following lines. As shown, moreover, the output signal v4 of adder circuit 13 contains only luminance signal component due to cancellation of chrominance signal on the lines before the boundary C, both luminance and chrominance signal components on the line next to the boundary C, and only the luminance signal component on the following lines. If the line correlation is lost in this way, the luminance signal component will leak into the output signal v3 of subtracter circuit 12, while the chrominance signal component will leak into the output signal v4 of the adder circuit 13 during the same line period. In other words, the loss of the line correlation causes the 3.58-MHz chrominance signal component to appear in the output signals v3 and v4 of subtracter circuit 12 and adder circuit 13 during the same line period. Therefore, the absence of the line correlation can be detected through the chrominance signal component appearing at the outputs of subtracter and adder circuits 12 and 13.

The output signals v3 and v4 of subtracter circuit 12 and adder circuit 12 are supplied to detectors, for example, envelope detectors 25 and 26 through bandpass filters 23 and 24 which select 3.58 MHz. The output signals v5 and v6 of envelope detectors 25 and 26 go high in response to frequency component of 3.58 MHz contained in the output signals of subtracter and adder circuits 12 and 13, as shown in FIG. 3. With the signal waveforms as shown in FIG. 3, the output signals v5 and v6 of envelope detectors 25 and 26 simultaneously go high during the line period immediately after boundary C. When the output signals v5 and v6 simultaneously go high, the output signal v7 of AND circuit 27 also goes high, as shown in FIG. 3.

The switch circuit 21 is so arranged as to be turned OFF when the output of AND circuit 27 goes high. Accordingly, in the absence of line correlation, that is, when luminance signal component leaks into the output signal v3 of subtracter circuit 12, frequencies of 0 to 0.5 MHz in the I signal are supplied to matrix circuit 17 for the narrowband demodulation of I signal. With the signal waveforms as shown in FIG. 3, the narrowband demodulation of I signal is performed during the line period immediately after boundary C.

Where the line correlation exists, that is, when the output signal v7 of AND circuit 27 is low, on the other hand, the switch circuit 21 is turned ON to couple bandpass filter 19 to matrix circuit 17. As a result, frequencies of 0 to 1.5 MHz in the I signal are supplied to matrix circuit 17 for the wideband demodulation of I signal.

As mentioned before, the detection of line correlation depends on the presence or absence of 3.58-MHz component in the output signal v4 of adder circuit 13 which is inherently the luminance signal. Having a frequency band of 0 to 4.2 MHz, the luminance signal may contain a frequency component of 3.58 MHz. However, the energy of the 3.58 MHz component in the luminance signal is much smaller than that of the carrier chrominance signal component which leaks into the luminance signal, it is easy to prevent the output signal v6 of envelope detector 26 from going high, in response to the 3.58-MHz luminance signal component. Accordingly, wrong operation due to the 3.58-MHz luminance signal component can be avoided with ease.

The lowpass filter 18, bandpass filter 19, adder circuit 20, and switch circuit 21 constitute a variable-band filter for the I signal from I signal demodulator 15. This variable-band filter switches by means of switch circuit 21 the bandwidth of I signal applied to matrix circuit 17 between 0 to 0.5 MHz and 0 to 1.5 MHz. Alternatively, switch circuit 21 may be formed as a variable attenuator so that, in the absence of line correlation, the output amplitude of bandpass filter 19 may be attenuated to e.g. a half of the output amplitude obtained when the line correlation exists. That is, in this invention, the I signal from I signal demodulator may be supplied to the matrix circuit through a variable-frequency attenuator responsive to the line correlation detector.

Figure 4:
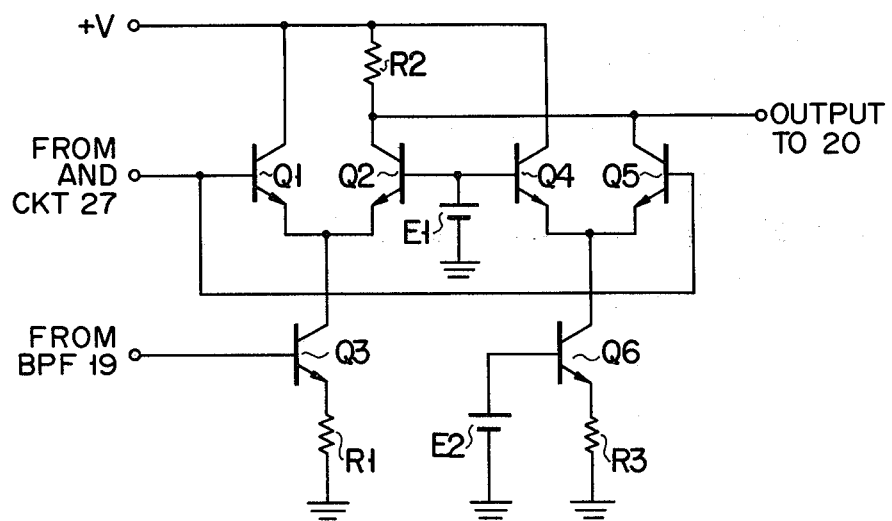
FIG. 4 is a circuit diagram showing an example of a switch circuit shown in FIG. 1.

Referring now to FIG. 4, there is shown, by way of example, a doubly-balanced type switch circuit which can be used also as a variable attenuator. This variable attenuator is formed of transistors Q1 to Q6, resistors R1 to R3, and bias sources E1 and E2. The output signal of bandpass filter 19 is applied to the base of transistor Q3 whose collector current is applied to the emitters of differential transistors Q1 and Q2. The transistor Q6 has its base biased by bias source E2 to supply a constant current to the emitters of differential transistors Q4 and Q5. The output of AND circuit 27 is coupled to the bases of transistors Q1 and Q5, and the bases of transistors Q2 and Q4 are biased by bias source E1. The output signal of the attenuator is extracted from the collectors of transistors Q2 and Q5 which are connected together to a power source +V through a load resistor R2.

In such circuit arrangement, transistors Q1 and Q5 are turned ON while the transistors Q2 and Q4 are turned OFF, when the output voltage of AND circuit 27 is sufficiently higher than the base bias voltage of transistors Q2 and Q4, that is, in the absence of line correlation. Accordingly, the output signal of bandpass filter 19 applied to the base of transistor Q3 cannot be extracted from the output terminal. On the other hand, when the output level of AND circuit 27 is low, that is, when the line correlation exists, the transistors Q1 and Q5 are turned OFF and transistors Q2 and Q4 are turned ON. As a result, the output signal of bandpass filter 19 is extracted from the collector of transistor Q2.

Depending on the setting of high output voltage level of AND circuit 27, or by connecting emitter resistors of transistors Q1 to Q5, both transistors Q1 and Q5 can be maintained ON in the absence of the line correlation. In this case, the collector current of transistor Q3 flows through both of transistors Q1 and Q2, so that the gain of the circuit will be reduced. Namely, the amplitude of the output signal obtained in the absence of line correlation can be made smaller than the case where the line correlation exists.

Figure 5:
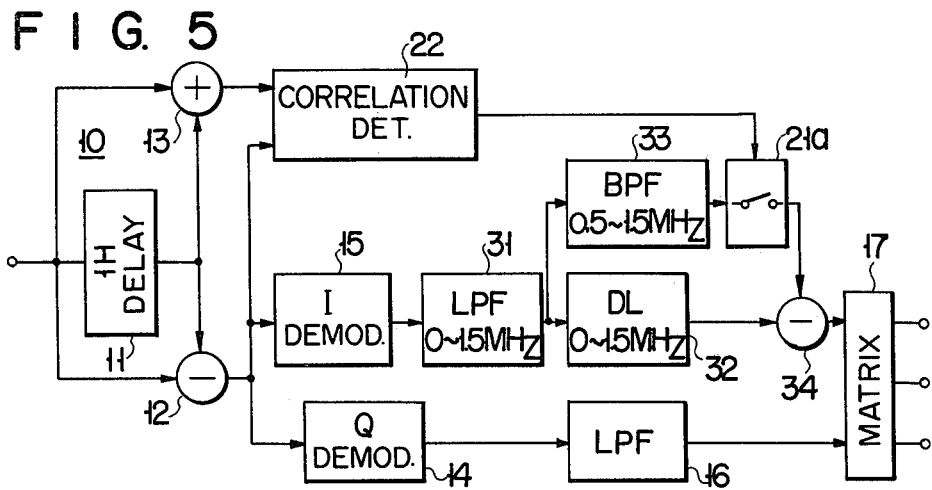
FIGS. 5 to 7 show alternative embodiments of the invention.
Figure 6:
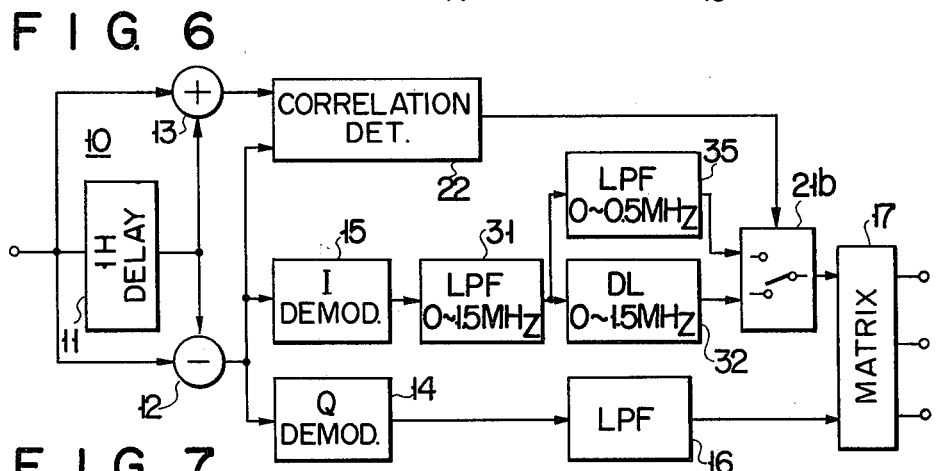
Figure 7:
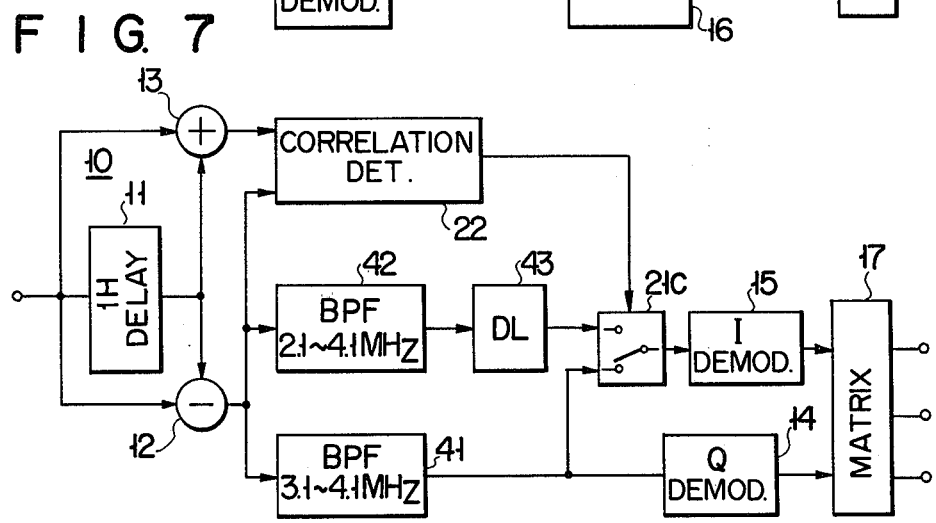

Referring now to FIGS. 5 to 7, there will be described alternative embodiments of the color demodulation device of the invention. In FIGS. 5 to 7, like reference numerals are used to designate the same portions as shown in FIG. 1.

In the embodiment of FIG. 5, the output signal of I signal demodulator 15 is supplied to a delay circuit 32 and a bandpass filter 33 through a lowpass filter 31 having a passband of 0 to 1.5 MHz. The delay circuit 32 has a passband of 0 to 1.5 MHz, while the bandpass filter 33 has a passband of 0.5 MHz to 1.5 MHz. The delay circuit 32 intends to compensate for a time delay caused by lowpass filter 16 having a narrower pass band and bandpass filter 33. The output signal of bandpass filter 33 is supplied through a switch circuit 21a to a subtracter circuit 34 to which the output signal of delay circuit 32 is supplied. In this embodiment, unlike the embodiment of FIG. 1, the switch circuit 21a is so constructed as to be turned ON by line correlation detector 22 in the absence of line correlation.

In the operation of the embodiment of FIG. 5, the switch circuit 21a is turned OFF when the line correlation exists, so that the output signal of delay circuit 32 is supplied to matrix circuit 17 without any subtraction from the output signal of bandpass filter 33. Thus, the wideband demodulation of I signal is performed. When no line correlation exists, on the other hand, the switch circuit 21a is turned ON to couple the output signal of bandpass filter 33 to subtracter circuit 34. As a result, frequency component of 0.5 MHz to 1.5 MHz is subtracted from the output signal of delay circuit 32 in subtracter circuit 34, and the frequency component of 0 to 0.5 MHz in I signal is supplied to matrix circuit 17. Thus, the narrowband demodulation of I signal is performed. The switch circuit 21a may be a variable attenuator which reduces the amplitude of output signal of bandpass filter 33 supplied to subtracter circuit 34 to zero when the line correlation exists, and attenuates the output amplitude of bandpass filter 33 in the absence of line correlation.

In the embodiment of FIG. 6, the output signal of I signal demodulator 15 is supplied to delay circuit 32 and lowpass filter 35 through lowpass filter 31. The lowpass filter 35 has a passband of 0 to 0.5 MHz. The output signals of delay circuit 32 and lowpass filter 35 are selectively supplied to a matrix circuit 17 by means of switch circuit 21b responsive to line correlation detector 22. The switch circuit 21b is so arranged that the output signal of delay circuit 32 may be coupled to matrix circuit 17 when the line correlation exists, and that the output signal of lowpass filter 35 may be coupled to matrix circuit 17 in the absence of line correlation.

In the embodiment of FIG. 7, the output signal of subtracter circuit 12 of signal separation circuit 10 is supplied to bandpass filters 41 and 42. The bandpass filter 41 has a passband of 3.1 MHz to 4.1 MHz, while the bandpass filter 42 has a passband of 2.1 MHz to 4.1 MHz. The output signal of bandpass filter 41 is supplied to switch circuit 21c which is followed by I signal demodulator 15, as well as to Q signal demodulator 14. The output signal of bandpass filter 42 is supplied to switch circuit 21c through delay circuit 43. In response to line correlation detector 22, switch circuit 21c couples the output signal of narrowband bandpass filter 41 to I signal demodulator 15 for the narrowband demodulation of I signal when no line correlation exists, and couples the output signal of wideband bandpass filter 42 to I signal demodulator 15 for the wideband demodulation of I signal when the line correlation exists.

The color demodulation device of this invention is not limited only to demodulation of a composite video signal according to the NTSC system, but may be used for demodulation of a composite video signal in which a carrier chrominance signal is multiplexed in frequency-interleaved relation with a luminance signal.

Further, a transient condition of the line correlation between video signals on adjacent horizontal lines may be detected so as to attenuate the amplitude level of frequency components ranging 0.5 to 1.5 MHz in the I signal.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention.

What we claim is:

1. A color demodulation device for demodulating carrier chrominance signal in a composite video signal, said composite video signal having luminance signal component and carrier chrominance signal component multiplexed in frequency-interleaved relation with the luminance signal component, said chrominance signal component being formed by quadrature modulation (carrier-suppressed AM) of a color subcarrier with an I signal and a Q signal, said I signal having a frequency band wider than the Q signal, comprising:

signal separation circuit means using a comb filter for separating the composite video signal into the luminance and carrier chrominance signal components, said luminance and chrominance signal components being extracted from first and second outputs of said signal separation circuit means, respectively;

line correlation detecting means coupled to said first and second outputs of said signal separation circuit means for detecting the correlation between video signals on adjacent horizontal scanning lines;

I signal demodulation circuit means coupled with said second output of said signal separation circuit means for demodulating the I signal;

Q signal demodulation circuit means coupled with said second output of said signal separation circuit means for demodulating the Q signal; and matrix circuit coupled to said I and Q signal demodulation circuit means, said I signal demodulation circuit means being responsive to said line correlation detecting means to perform wideband demodulation of the I signal so that the I signal is applied in a wide frequency band to said matrix circuit means where there exists line correlation, and to perform narrowband demodulation of the I signal so that the I signal is applied to said matrix circuit means in a narrow frequency band where there exists no line correlation.

2. A color demodulation device according to claim 1, wherein said I signal demodulation circuit means includes an I signal demodulation circuit for demodulating the I signal from the carrier chrominance signal component extracted from said signal output of said signal separation circuit means;

a lowpass filter and a bandpass filter connected to said I signal demodulation circuit to pass lower and higher frequency components of the I signal respectively;

an adder circuit for adding together output signals of said lowpass filter and said bandpass filter; and means coupled between said bandpass filter and said adder circuit and responsive to said line correlation detecting means for controlling the amplitude of the output signal of said bandpass filter supplied to said adder circuit.

3. A color demodulation device according to claim 1, wherein said I signal demodulation circuit means includes an I signal demodulation circuit for demodulating the I signal from the carrier chrominance signal component extracted from said second output of said signal separation circuit means;

a bandpass filter coupled to said I signal demodulation circuit to pass higher frequency components of the I signal;

a delay circuit connected to said I signal demodulation circuit to pass the frequency band of the I signal;

a subtracter circuit coupled to receive output signals of said lowpass filter and said delay circuit; and means coupled between said subtracter circuit and said bandpass filter and responsive to said line correlation detecting means for controlling the amplitude of the output signal of said bandpass filter supplied to said subtracter circuit.

4. A color demodulation device according to claim 1, wherein said I signal demodulation circuit means includes an I signal demodulation circuit for demodulating the I signal from the carrier chrominance signal component extracted from said second output of said signal separation circuit means;

a lowpass filter coupled to said I signal demodulation circuit to pass lower frequency components of the I signal;

a delay circuit coupled to said I signal demodulation circuit to pass the frequency band of the I signal; and means responsive to said line correlation detecting means for selectively coupling output signals of said lowpass filter and said delay circuit to said matrix circuit means.

5. A color demodulation device according to claim 1, wherein said Q signal demodulation circuit means includes a first bandpass filter connected to receive the carrier chrominance signal component extracted from said second output of said signal separation circuit means, said filter having a first passband necessary for the demodulation of the Q signal; and a Q signal demodulation circuit coupled with said first bandpass filter, and wherein said I signal demodulation circuit means includes a second bandpass filter connected to receive the carrier chrominance signal component extracted from said second output of said signal separation circuit means, said filter having a second passband to pass I signal component contained in the chrominance signal components, said second passband being wider than said first passband;

an I signal demodulation circuit; and means for selectively coupling output signals of said first and second bandpass filters to said I signal demodulation circuit in response to said line correlation detecting means.

6. A color demodulation device according to claim 1, wherein said line correlation detecting means includes first and second bandpass filters coupled respectively to said first and second outputs of said signal separation circuit means to pass a color subcarrier frequency component;

first and second envelope detectors coupled respectively to said first and second bandpass filters; and means coupled with said first and second envelope detectors for detecting the absence of line correlation in response to simultaneous appearance of output signals at outputs of said first and second envelope detectors.

* * * * *